United States Patent [19]

Kervagoret

[11] Patent Number: 5,476,312
[45] Date of Patent: Dec. 19, 1995

[54] ANTI-LOCKING AND ANTI-WHEELSPIN BRAKE DEVICE WITH SINGLE DISTRIBUTOR

[75] Inventor: Gilbert Kervagoret, Argenteuil, France

[73] Assignee: Bendix Europe Services Techniques, Drancy, France

[21] Appl. No.: 90,058

[22] PCT Filed: May 25, 1993

[86] PCT No.: PCT/FR93/00502

§ 371 Date: Aug. 6, 1993

§ 102(e) Date: Aug. 6, 1993

[87] PCT Pub. No.: WO93/24351

PCT Pub. Date: Dec. 9, 1993

[30] Foreign Application Priority Data

May 26, 1992 [FR] France ................... 92 06397

[51] Int. Cl.⁶ .................................. B60T 15/20
[52] U.S. Cl. .................. 303/117.1; 303/116.2; 303/DIG. 2; 137/625.19
[58] Field of Search ............. 303/10, 11, 116.1, 303/116.2, 117.1, DIG. 1, DIG. 2; 137/625.19

[56] References Cited

U.S. PATENT DOCUMENTS

| | | | |
|---|---|---|---|
| 4,523,792 | 6/1985 | Belart et al. | 303/117.1 X |
| 4,700,991 | 10/1987 | Nishimura et al. | 303/DIG. 2 X |
| 4,824,181 | 4/1989 | Tomala | 303/117.1 X |
| 4,842,344 | 6/1989 | Kuwana et al. | 303/117.1 |
| 4,852,952 | 8/1989 | Kervagoret | 303/10 X |

FOREIGN PATENT DOCUMENTS 6024322  2/1994  Japan ................... 303/117.1

*Primary Examiner*—Robert J. Oberleitner
*Assistant Examiner*—Alfred Muratori
*Attorney, Agent, or Firm*—Larry Palguta; Leo H. McCormick, Jr.

[57] ABSTRACT

A distributor for controlling the distribution of fluid to a brake system which includes an anti-lock and an anti wheelspin function and in particular functional operation during a brake condition wherein the front wheels are actuated at the same time a single back wheel is actuated.

5 Claims, 1 Drawing Sheet

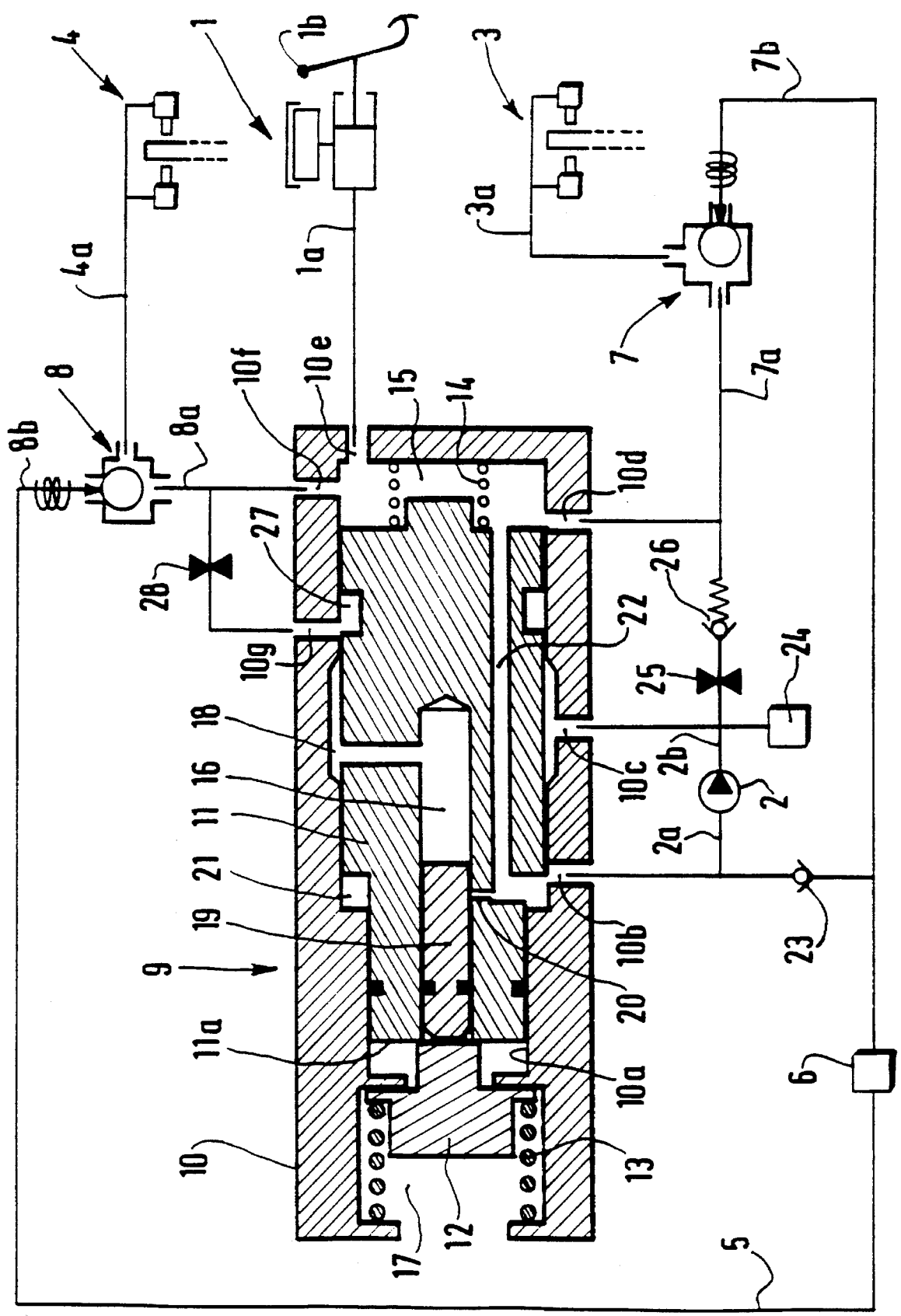

5,476,312

ANTI-LOCKING AND ANTI-WHEELSPIN BRAKE DEVICE WITH SINGLE DISTRIBUTOR

The present invention relates to a hydraulic brake device, capable of being actuated directly or automatically, and comprising at least:

a master cylinder which is filled with a brake fluid which it can dispense on an outlet, and which is capable of being controlled by a brake pedal so as to constitute a first source of high hydraulic pressure, a pump having a suction inlet and a force outlet, this pump being capable of being controlled automatically so as to constitute a second source of high hydraulic pressure, a first pressure receiver adapted to use a high pressure so as to bring about the braking of a driving wheel, a second pressure receiver adapted to use a high pressure so as to bring about the braking of a non-driving wheel, a hydraulic system formed of a network of links comprising at least one low pressure link and links connecting the outlets of the sources of high pressure to the receivers, first and second electrovalves installed on the hydraulic system and associated with the first and second receivers respectively, each of them being capable of being controlled so as to connect the corresponding receiver selectively to the low pressure or to a source of high pressure, and a distributor also installed on the hydraulic system so as to modify the network of links in accordance with instructions received by this distributor, this distributor comprising a body pierced with a bore in an axial direction between two extreme positions, under the control of the pressure of at least one source of high pressure, so as to selectively to connect the outlet of the master cylinder and the inlet of the pump.

BACKGROUND OF THE INVENTION

Devices of this type are well known and are in particular used in brake systems making it possible to avoid a locking of the wheels in the case of heavy braking on a surface having insufficient adhesion and a spinning of the driving wheels in the case of acceleration which is too fierce to drive the vehicle.

One problem which constantly arises in the design of such systems is that which consists in preventing the relative complexity of the functions brought into play from being accompanied by a comparable complexity of the means used in order to perform these functions.

SUMMARY OF THE INVENTION

In this context, the object of the present invention is to provide a brake device with a distributor wherein the latter, although of simple design and of modest cost, can fulfill a plurality of functions.

To this end, the device of the invention is essentially characterized in that the slide valve is capable of moving in the bore between a neutral position and each of the two extreme positions located on either side of the neutral position, the slide valve moving towards the first and second exteme positions, against respective first and second resilient forces, under the effect of a pressure rise in respective first and second chambers of the distributor, connected to the respective outlets of the first and second pressure sources, in that the slide valve, in the first extreme position, interrupts a link, established for the other positions of the slide valve, between the outlet of the master cylinder and the inlet of the pump, and in that the slide valve, in the second extreme position, interrupts a link, established for the other positions of the slide valve, between the outlet of the master cylinder and the first receiver.

According to an advantageous embodiment, the second chamber is partly formed by a bore of the slide valve, in which slides a piston pushed towards the outside of the bore by the pressure prevailing in the latter, and towards the inside by the first force, this piston opening, after a predetermined outward travel from the neutral position, a duct pierced in the slide valve and placing the first and second chambers in communication, which results in a limitation of the output pressure of the pump.

It is moreover convenient to make provision for the slide valve, in the first extreme position, to establish a direct link, interrupted for the other positions of the slide valve, between the outlet of the pump and the second receiver.

This direct link is preferably established by overlapping of a first annular groove forming a radial extension of the bore and of a second annular groove hollowed out in the slide valve, and the first groove can serve to connect the outlet of the pump permanently to the second chamber.

DESCRIPTION OF THE DRAWING

The invention will now be described by way of example with reference to the single FIGURE which shows diagrammatically a device according to the invention.

DETAILED DESCRIPTION OF THE INVENTION

The device, in the embodiment shown, is presumed to constitute one of the diagonals of an X-configuration brake system wherein each front wheel on each side of the vehicle is braked at the same time as the back wheel on the other side.

This device comprises firstly a master cylinder 1 filled with a brake fluid whose pressure, on an outlet 1a of this master cylinder may be brought to a high value by actuating a pedal 1b, this master cylinder therefore constituting a first source of high hydraulic pressure.

A pump 2, having an inlet 2a for suction and an outlet 2b for delivery, constitutes a second source of high pressure. This pump is capable of being controlled, automatically, by an external signal generated by a computer having detected a locking or wheelspin situation, using techniques known to the person skilled in the art and extraneous to the present invention.

This device comprises moreover a first receiver 3 comprising at least one brake actuator and adapted to use a high pressure received on its inlet 3a so as to bring about the braking of a driving wheel.

A second receiver 4, similar to the first and fed via its inlet 4a, is provided so as to perform the braking of a non-driving wheel.

A hydraulic system, composed of links represented diagrammatically by simple lines and comprising in particular a low pressure link 5, onto which is connected a low pressure buffer reserve 6, interconnects the members already described and those described hereinafter.

First and second electrovalves 7 and 8, associated with the first and second receivers 3 and 4 respectively, are installed on the hydraulic system, each of them being capable of being controlled, in a manner known per se, so as to connect the corresponding receiver selectively to one of the sources of high pressure 1, 2, through an inlet such as 7a, 8a, or to the low pressure link 5, through an outlet such as 7b, 8b, so as to be able to regulate the braking forces exerted by the receivers 3 and 4.

Lastly the device of the invention comprises a distributor 9, also installed on the hydraulic system, designed to modify the network of links of this system in accordance with instructions, and in which is concentrated a major proportion of the features of the invention, it being possible for the other components shown in the FIGURE to be readily referred to in the course of the description of this distributor.

The latter comprises essentially a body 10 pierced by an axial bore 10a in which slides a slide valve 11 capable of adopting a neutral position, as shown, a first extreme position (on the left), and a second extreme position (on the right).

The position of the slide valve is in fact determined in particular by a first resilient force exerted, through a bearing piece 12, by a first spring 13 bearing against the body 10, by a second resilient force exerted by a second spring 14 also bearing against the body, by the pressure in a first chamber 15 and by the pressure in a second chamber 16, the slide valve adopting its neutral position when the pressures in the chambers 15 and 16 are zero or insufficient to overcome the opposing resilient forces.

The springs 13 and 14 are prestressed, the first spring 13 being more powerful than the second and set in a chamber 17 at atmospheric pressure, whereas the second spring 14 is set in the first chamber 15.

The second chamber 16 takes the form of an axial bore pierced in the slide valve 11, opening onto a first annular groove 18 forming a radial extension of the bore 10a.

This chamber 16 is moreover closed axially by a piston 19 which slides therein in leaktight manner and which bears, like the axial face 11a of the slide valve 11, against the bearing piece 12.

For a travel of length A of the piston 19 in the chamber 16 from the neutral rest position shown in the FIGURE, this piston 19 uncovers a small aperture 20 serving to place the chamber 16 in communication with an annular chamber 21 formed between a shoulder of the body 10 and a shoulder of the slide valve 11, this annular chamber 21 being itself in permanent communication with the first chamber 15 through a channel 22 pierced axially in the slide valve.

The annular chamber 21 communicates, except for the first position of the slide valve resulting from an actuation of the master cylinder, with the inlet 2a of the pump 2 via an aperture 10b of the body 10 of the distributor.

A non-return valve 23, connected to the aperture 10b and to the inlet 2a of the pump, prevents the loss of pressure by an escape of fluid towards the buffer reserve 6 while allowing fluid to be taken from this reserve by the pump 2.

The outlet 2b from the pump is connected on the one hand to the annular chamber 18 through an aperture 10c of the body of the distributor, on the other hand to a chamber 24 at high pressure, and lastly to the inlet 7a of the electrovalve 7 through a restrictor 25 and a calibrated non-return valve 26 preventing the loss of pressure in the receiver 3 by an escape of liquid towards the groove 18, which would delay the return of the distributor to its neutral position at the end of a wheelspin phase.

An aperture 10d pierced in the body 10 of the distributor causes the first chamber 15 to communicate, except for the second position of the slide valve 11, with the outlet of the valve 26 and the inlet 7a of the electrovalve 7.

Moreover, the first chamber 15 communicates permanently with the outlet 1a of the master cylinder 1 through an aperture 10e and with the inlet 8a of the electrovalve 8 through an aperture 10f.

Lastly, the slide valve 11 of the distributor 9 has an annular groove 27 adapted to place in communication, in the first position of the slide valve 11, the groove 18 into which opens the second chamber 16, with the inlet 8a of the electrovalve 8 through an aperture 10g of the distributor body and a restrictor 28.

MODE OF OPERATION OF THE INVENTION

The operation of the device can now be described with reference to the two states which the latter adopts, respectively in the case of braking controlled directly by the driver with possible activation of an automatic anti-locking function, and in the case of automatic braking, which is not controlled by the driver and is triggered by the detection of a spinning of the driving wheels.

CASE OF CONTROLLED BRAKING, WITH AUTOMATIC ANTI-LOCKING

The process is triggered by the driver acting on the brake pedal 1b.

The pressurising of the first chamber 15 permits the supply of the receivers 3 and 4 with fluid under pressure.

The pressure in the chamber 15 moves the slide valve 11 towards its first position (towards the left in the FIGURE), which has the effect of blanking off the aperture 10b, therefore of isolating the inlet 2a of the pump 2 from the master cylinder 1 and of placing the outlet 2b of the pump 2 in communication with the non-driving wheel receiver 4, via the groove 18 of the body 10, the groove 27 of the slide valve 11, the restrictor 28 and the electrovalve 8.

The outlet 2b of the pump 2 is also connected to the driving wheel receiver 3 via the restrictor 25, the valve 26 and the electrovalve 7.

In these conditions, if X designates the initial compression, in length, of the first spring 13 in its neutral position (FIGURE), A the travel of the piston 19 in the bore 16 in order to uncover the aperture 20, B the travel of the slide valve 11 towards the left from the neutral position, K1 the stiffness of the spring and S the cross section of the piston 19, the pump 2 begins to deliver into the master cylinder 1 through the channel 22 and the outlet 1a as soon as the output pressure from the pump reaches the value given by $$K1 \cdot (X+A+B)/S.$$

It is therefore possible, by fixing this value at the maximum value of the pressure capable of being produced by the master cylinder 1, i.e. about 180 bars, to limit in this manner the maximum value of the pressure produced by the pump 2.

The operation of the anti-locking function, produced by automatic control of the pump 2 and of the electrovalves 7 and 8 will not be described insofar as it is well known to the person skilled in the art and insofar as it is extraneous to the specific features of the invention.

CASE OF AN AUTOMATIC BRAKING TRIGGERED BY A WHEELSPIN

Once again, the detection of a wheelspin, that is to say a racing of the driving wheels, falls outside the present invention, is well known to the person skilled in the art and therefore requires no description. Such a detection causes, automatically, the startup of the pump 2 the effects of which, in the context of the invention, are as follows:

The inlet 2a of the pump 2 is in communication, through the channel 22, with the outlet 1a of the master cylinder. The latter, which is not normally acted upon by the driver in the acceleration phase, supplies fluid to the pump 2.

The pressure on the outlet 2b of the pump rises as soon as the latter is started up owing to the existence of the restrictor 25 and of the calibrated valve 26.

This pressure is established in the second chamber 16 and its value is determined so as to cause the slide valve 11 to translate, against the second spring 14, towards its right stop which it encounters after a travel of length C.

This movement has the effect of blanking off the aperture 10d, therefore of isolating the master cylinder 1 from the driving wheel receiver 3.

Under these conditions, the electrovalve 7 is controlled automatically so as to modulate the braking force exerted by the receiver 3, according to techniques for example known to the person skilled in the art.

Since the non-driving wheel receiver 4 remains at the pressure of the master cylinder 1, there is no need to energize, as is generally done, the electrovalve 8 with the risk of considerably reducing its life, if it is energized throughout the duration of the anti-wheelspin process.

The relatively small leakages from the slide valve 11 are returned to the master cylinder 1.

Throughout the anti-wheelspin cycle, it remains possible for the driver to resume control of the braking by actuating the pedal 1b. Although a small pressure threshold in order to cause the slide valve 11 to trip may appear, the emergency braking can easily be ensured.

As soon as the pressure force on the cross-section of the piston 19 reaches the value given by $(Y+A-C) \cdot K2$ where Y is the initial compression, in length, of the second spring 14 in the neutral position and K2 the stiffness of this spring, the piston 19 frees the aperture 20 which opens the second chamber 16 onto the master cylinder 1 through the channel 22, and the pressure at the pump outlet is limited to the maximum pressure inside the receiver 3, i.e. for example in the vicinity of 120 bars.

The pressure limiter constructed in this manner has a stability and a noise level which are much more satisfactory than those resulting from the conventional use of a ball-type overpressure valve.

At the end of an anti-wheelspin sequence, the pump 2 is stopped automatically and the second chamber 16, of restricted volume, empties into the chambers 15 and 21 under the action of the springs 13 and 14 and by virtue of the clearances existing between the slide valve 11 and the body 10 of the distributor.

The slide valve 11 uncovers very rapidly the aperture 10d, which re-establishes the link between the master cylinder 1 and the driving wheel receiver 3, the assembly returning then very rapidly to the rest position shown in the FIGURE.

I claim:

1. A hydraulic brake device, capable of being actuated directly or automatically, and comprising at least:

a master cylinder filled with a brake fluid dispensable at an outlet, and which is capable of being controlled by a brake pedal to constitute a first source of high hydraulic pressure, a pump having an inlet and an outlet, the pump capable of being controlled automatically to constitute a second source of high hydraulic pressure, a first pressure receiver adapted to use a high fluid pressure to effect the braking of a driven wheel, a second pressure receiver adapted to use a high fluid pressure to effect the braking of a non-driven wheel, a hydraulic system formed of a network of links comprising at least one low pressure link and links connecting the outlets of the sources of high pressure to the receivers, first and second electrovalves of the hydraulic system and associated with the first and second receivers respectively, each capable of being controlled to connect selectively the corresponding receiver to one of the low pressure link and one of the sources of high pressure, and a distributor of the hydraulic system which modifies the network of links in accordance with instructions received by this distributor, the distributor comprising a body having a bore and a slide valve movable in the bore in an axial direction between two extreme positions under the control of the pressure of at least one of the sources of high pressure, to connect selectively the outlet of the master cylinder and the inlet of the pump, characterized in that the slide valve is capable of moving in the bore between a neutral position and each of the two extreme positions located on either side of the neutral position, the slide valve movable toward the extreme positions, against respective first and second resilient forces, under the effect of a pressure rise in respective first and second chambers of the distributor connected to the respective outlets of the first and second sources of high pressure, and the slide valve, in a first extreme position, interrupts a link established for other positions of the slide valve between the outlet of the master cylinder and the inlet of the pump and the slide valve, in a second extreme position, interrupts a link established for other positions of the slide valve between the outlet of the master cylinder and the first receiver.

2. The device according to claim 1, characterized in that the second chamber is partly formed by a bore of the slide valve, and in which slides a piston pushed outwardly of the bore of the slide valve by pressure prevailing in the bore, and pushed inwardly of the bore of the slide valve by a first resilient force, the piston opening, after a predetermined outward travel from the neutral position, a duct in the slide valve and placing the first and second chambers in communication which results in a limitation of the output pressure of the pump.

3. The device according to claim 1, characterized in that the slide valve, in the first extreme position, establishes a direct link interrupted for the other positions of the slide valve, between the outlet of the pump and the second receiver.

4. The device according to claim 3, characterized in that said direct link is established by an overlapping of a first annular groove forming a radial extension of the bore and a second annular groove in the slide valve.

5. The device according to claim 4, characterized in that the first groove connects permanently the outlet of the pump to the second chamber.

* * * * *